(12) United States Patent  
Ishibashi

(10) Patent No.: US 6,993,135 B2  
(45) Date of Patent: Jan. 31, 2006

(54) CONTENT PROCESSING SYSTEM AND CONTENT PROTECTING METHOD

(75) Inventor: Yasuhiro Ishibashi, Ome (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 867 days.

(21) Appl. No.: 09/803,026

(22) Filed: Mar. 12, 2001

(65) Prior Publication Data

US 2001/0021255 A1   Sep. 13, 2001

(30) Foreign Application Priority Data

Mar. 13, 2000 (JP) .............................. 2000-069262

(51) Int. Cl.
 *H04L 9/00* (2006.01)
(52) U.S. Cl. ....................... 380/277; 713/194; 711/163

(58) Field of Classification Search ................ 713/166, 713/200, 184, 194; 380/277, 28, 228, 286; 705/57; 711/163, 164, 151; 710/5, 18
See application file for complete search history.

(56) References Cited

U.S. PATENT DOCUMENTS

| 5,793,868 | A | * | 8/1998 | Micali .......................... 380/28 |
| 5,915,018 | A | | 6/1999 | Aucsmith ....................... 380/4 |
| 6,128,740 | A | * | 10/2000 | Curry et al. ................. 713/200 |
| 6,233,341 | B1 | * | 5/2001 | Riggins ...................... 380/277 |
| 6,631,427 | B2 | * | 10/2003 | Kubo ........................... 710/17 |

* cited by examiner

*Primary Examiner*—Kim Vu  
*Assistant Examiner*—Thanhnga B. Truong  
(74) *Attorney, Agent, or Firm*—Finnegan, Henderson, Farabow, Garrett & Dunner, L.L.P.

(57) ABSTRACT

A content processing system for use in an electronic apparatus includes a unit for acquiring first revocation list information corresponding to a first media type, and a unit for recording the first revocation list information on a recording medium of a second media type. The recorded first revocation list information is used in authentication between the electronic apparatus and the recording medium of the second media type.

12 Claims, 6 Drawing Sheets

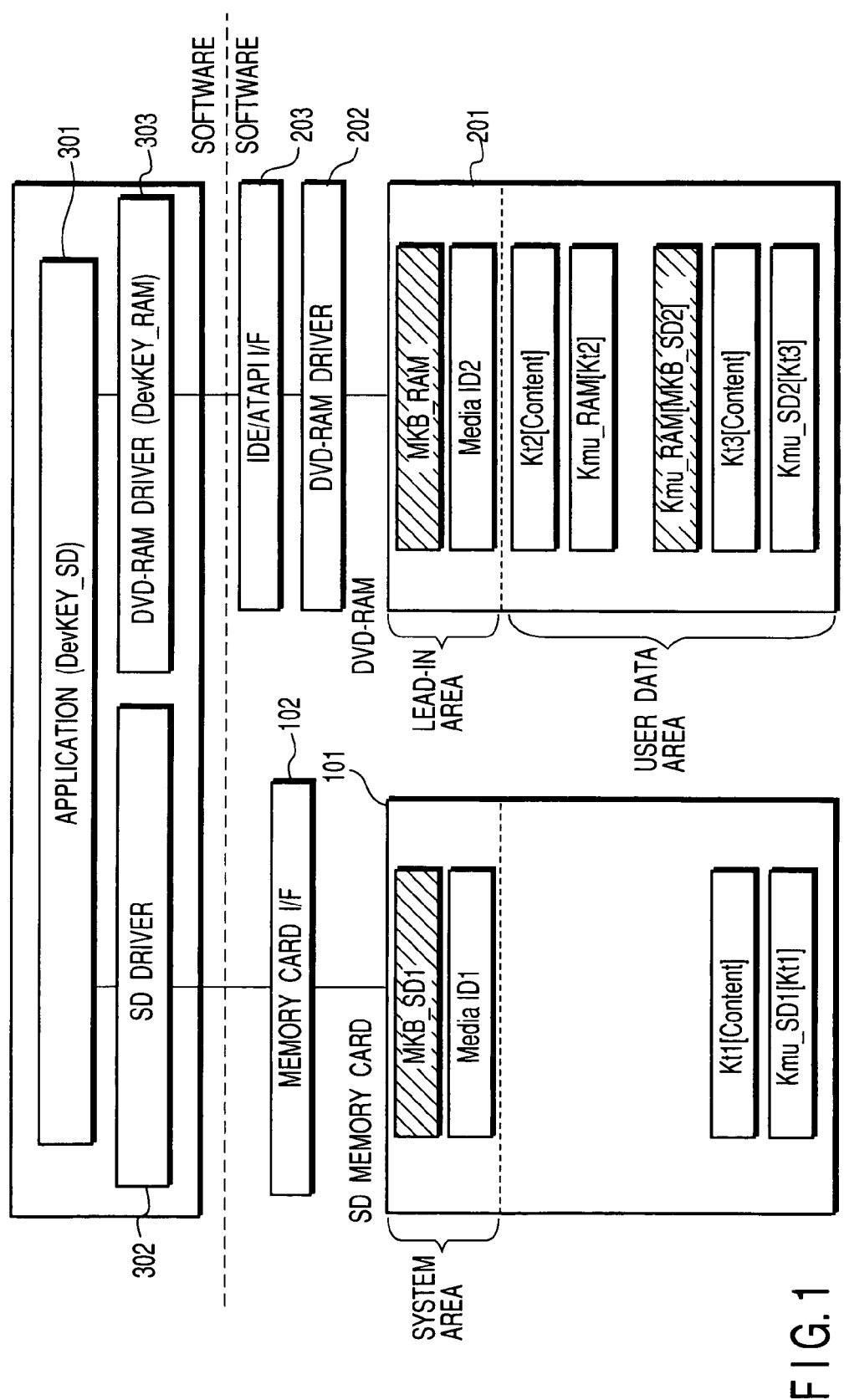
F I G. 1

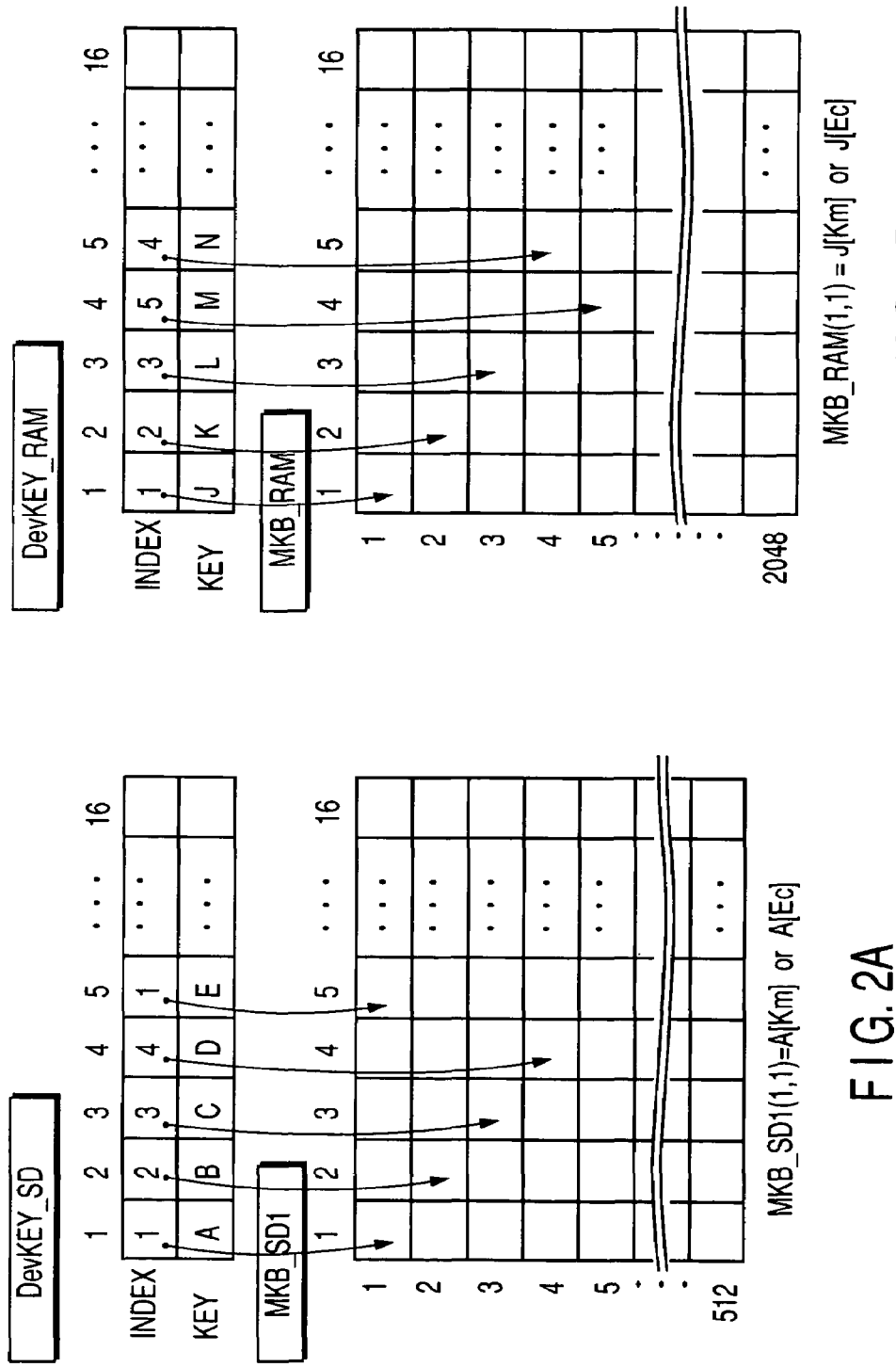

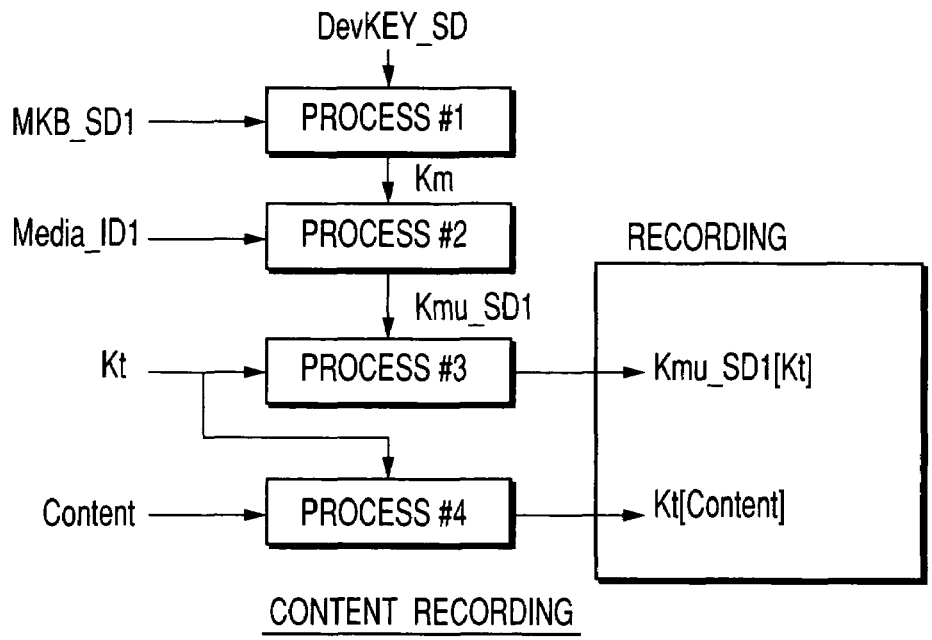
F I G. 3A
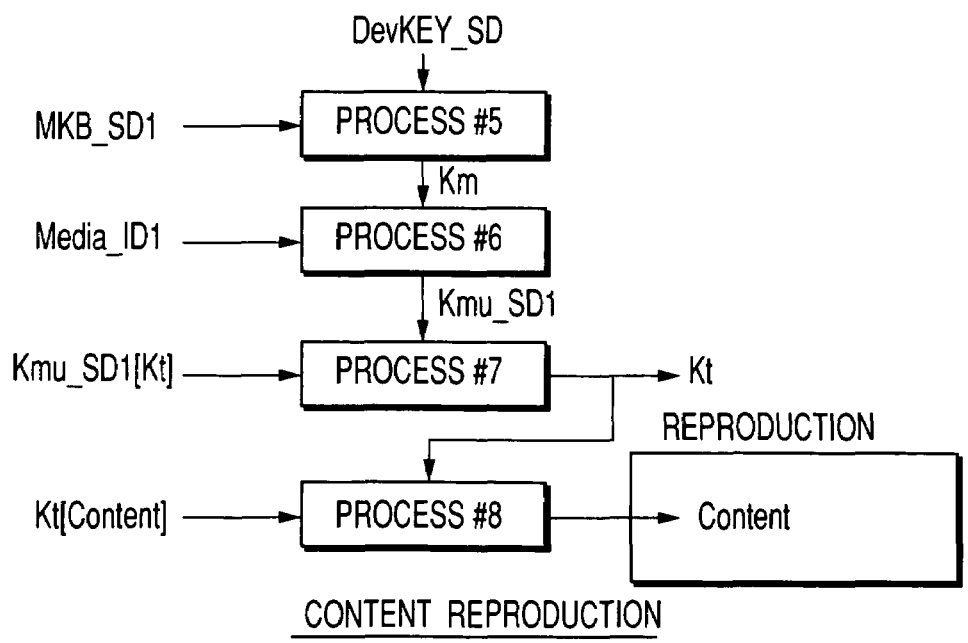
F I G. 3B

CONTENT PROCESSING SYSTEM AND CONTENT PROTECTING METHOD

CROSS-REFERENCE TO RELATED APPLICATIONS

This application is based upon and claims the benefit of priority from the prior Japanese Patent Application No. 2000-069262, filed Mar. 13, 2000, the entire contents of which are incorporated herein by reference.

BACKGROUND OF THE INVENTION

The present invention relates to content processing system capable of processing various digital contents such as image data and sound data, and a content protecting method.

Recently, with the advance of computer technologies, various electronic apparatuses such as multimedia personal computers, set-top boxes, players, and game machines have been developed. The electronic apparatuses of this type can reproduce diverse digital contents such as image data and sound data stored in recording media, and can also use digital contents by downloading them through, e.g., the Internet.

These digital contents can be copied or downloaded without being degraded by the use of digital encoding technologies such as MPEG2 and MP3. Hence, the necessity of technologies for protecting such digital contents from illegal use is being demanded from the viewpoint of copyright protection.

Recently, therefore, these mechanisms of authentication and encryption are beginning to be developed primarily for memory cards and removable media, which allow exchange of contents only between electronic apparatuses having a valid copyright protecting function and recording media.

A representative authentication and encryption technology is a mechanism which performs authentication by using device identification information unique to an electronic apparatus and a key matrix called revocation list information recorded on a recording medium, thereby eliminating invalid electronic apparatuses and issuing an encryption key to valid electronic apparatuses. By using this mechanism, it is possible, by simply updating only the revocation list information recorded on a recording medium before shipment, to nullify the use of device identification information found to be hacked, thereby protecting contents against illegal attacks.

As the data size of the revocation list information is increased, the number of the combinations of device identification information to be eliminated can be increased. Accordingly, the data size is preferably as large as possible.

In practice, however, different types of recording media have largely different storage capacities. Therefore, if pieces of revocation list information having a common size are used between different kinds of media, various problems arise. For example, if the size of the revocation list information is too large for a recording medium such as a memory card having a relatively small storage capacity, a memory size to be allocated as a user data area is reduced. Also, the number of device identification information which can be authenticated by the revocation list information is finite. Hence, if common revocation list information is defined between different types of media, problems such as an insufficient number of allocable device identification information arise.

On the other hand, when revocation information and corresponding device identification information are defined for each type of recording medium, it is possible to use revocation list information having a size optimum for each recording media type. When this is the case, however, an apparatus, such as a personal computer, capable of handling various types of recording media poses the following problem in regard to the compatibility between the recording media.

For example, an application program running on a valid apparatus which is assigned device identification information for a memory card can process a content on a memory card to be used, by performing authentication by using the device identification information of the apparatus and revocation list information previously recorded on the memory card. However, when a recording medium, such as a DVD-RAM, other than a memory card is to be handled, processing such as transfer of a content from the memory card to the DVD-RAM cannot be performed because revocation list information previously recorded on the DVD-RAM cannot be processed by the device identification information for a memory card. Accordingly, even when a user has purchased a valid DVD-RAM drive corresponding to a copyright protecting function, DVD-RAMs cannot be actually handled similarly to memory cards. This is very inconvenient for the user.

BRIEF SUMMARY OF THE INVENTION

Accordingly, it is an object of the present invention to provide a content processing system and content protecting method capable of handling a recording medium of a certain media type by using device identification information corresponding to another specific media type, and also capable of equally handling valid recording media corresponding to a copyright protecting function regardless of the types of these media.

According to one aspect of the present invention, there is provided a content processing system for use in an electronic apparatus, comprising: means for acquiring first revocation list information corresponding to a first media type; and means for recording the first revocation list information on a recording medium of a second media type, the recorded first revocation list information being used in authentication between the electronic apparatus and the recording medium of the second media type.

According to another aspect of the present invention, there is provided a content protecting method comprising the steps of: loading first revocation list information corresponding to a first media type into an electronic apparatus; recording the loaded first revocation list information on a recording medium of a second media type; and using the recorded first revocation list information in authentication between the electronic apparatus and the recording medium of the second media type.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the basic configuration of a content processing system according to an embodiment of the present invention;

FIGS. 2A and 2B are views for explaining the relationship between a media key block and device key used in the system of the embodiment;

FIGS. 3A and 3B are views for explaining the principle of content encryption/decryption used in the system of the embodiment;

DETAILED DESCRIPTION OF THE INVENTION

Figure 4:
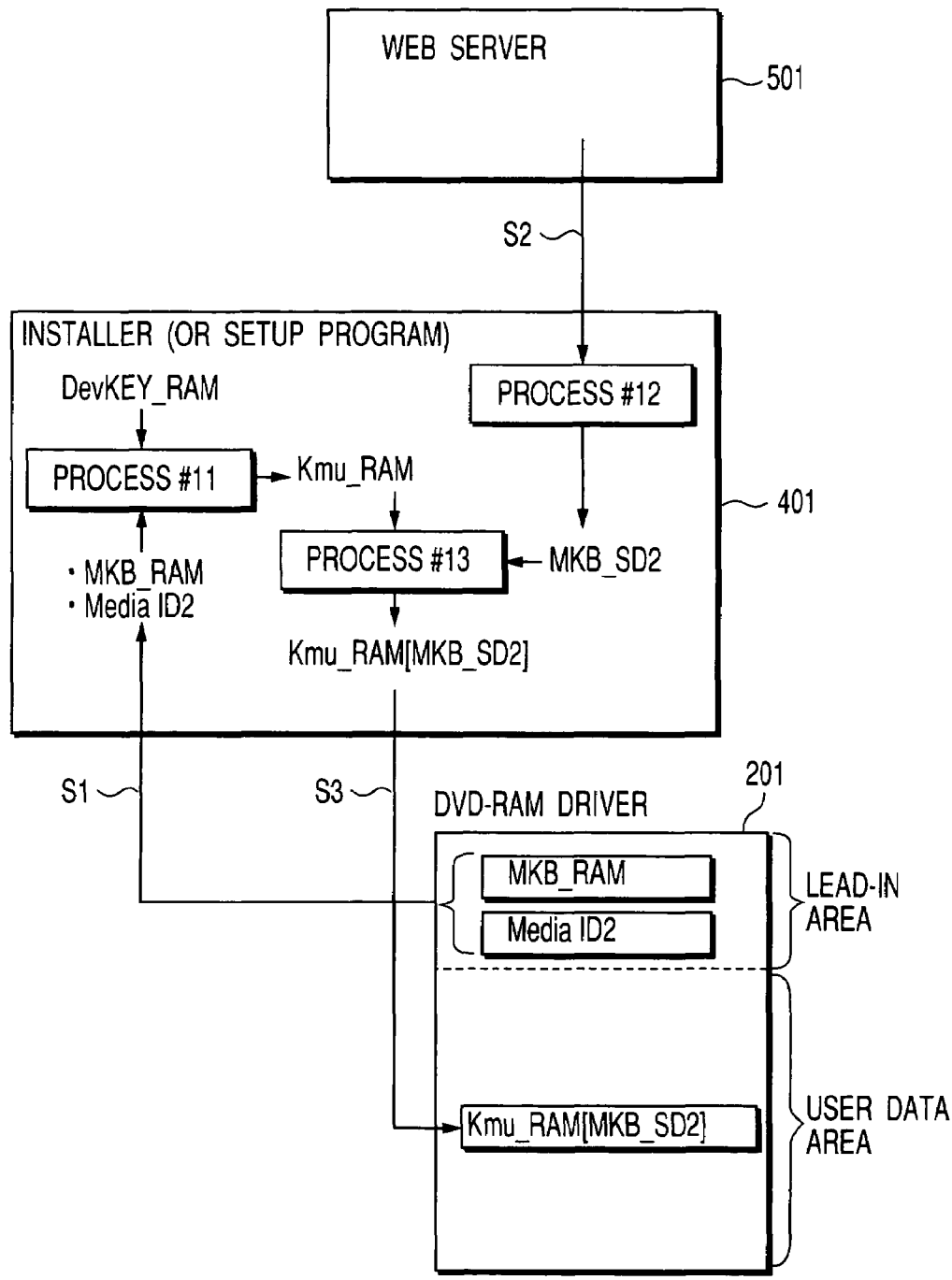
FIG. 4 is a view for explaining the procedure of a media key block writing process performed by the system of the embodiment.

An embodiment of the present invention will be described below with reference to the accompanying drawing.

FIG. 1 shows the system configuration of a content processing system according to an embodiment of the present invention. This content processing system processes various digital contents such as image data and sound data and includes an electronic apparatus such as a personal computer. A content protecting method of this content processing system is based on the management of content encryption/decryption by the use of a media-unique key unique to each recording medium for recording contents. This is to allow contents of the same recording medium to be reproduced even when the medium is used by another personal computer or electronic apparatus. Contents are encrypted and recorded on each recording medium by using a media-unique key obtained by authentication of the medium.

Management of content encryption/decryption using the media-unique key is executed by a content processing application program 301 incorporating a function dedicated to the management. This application program 301 is implemented as tambour resistant software. Tambour resistant software has a defending function against attacks such as illegal internal analysis and alteration.

In this embodiment, an SD (Secure Digital) memory card 101 and a DVD-RAM 201 are used as recording media used to record and read out content. Read and write of the SD memory card 101 are performed via memory card interface 102 of this electronic apparatus and an SD driver 302 as a device driver program for controlling an SD card. Read and write of the DVD-RAM 201 are performed by a DVD-RAM drive 202 connected to an IDE/ATAPI interface 203 of the electronic apparatus and a DVD-RAM driver 303 as a device driver program for controlling the DVD-RAM drive 202.

The SD driver 302 and the DVD-RAM driver 303 are also implemented as tambour resistant software.

In this embodiment, content encryption/decryption management using these recording media is performed by using revocation list information previously recorded on each recording medium and device identification information previously prepared for each electronic apparatus and unique to that electronic apparatus.

The revocation list information is authentication information in which a list of device identification information of electronic apparatuses to be eliminated for content protection is embedded. This information is used to check whether the device identification information of an electronic apparatus to be authenticated is to be nullified, and to generate a media-unique key if the device identification information is found to be valid. This revocation list information is made up of a large number of pieces of key matrix information and is referred to as a media key block (MKB) hereinafter. A recording medium found to have a valid copyright protecting function is shipped with the media key block (MKB) recorded on it.

The device identification information is identification information assigned to each electronic apparatus, and is issued only to an electronic apparatus found to have a valid copyright protecting function. Each electronic apparatus is shipped with this device identification information embedded in it. In the following description, the device identification information is referred to as a device key (DevKEY).

The content of the media key block (MKB) differ from one recording medium to another. Different media key blocks (MKBS) are used in the SD memory card 101 and the DVD-RAM 201. That is, a media key block (MKB_SD1) defined for an SD memory card is previously recorded on the SD memory card 101. Also, a media key block (MKB_RAM) defined for a DVD-RAM is previously recorded on the DVD-RAM 201. These media key blocks are recorded in write-protected read only areas, i.e., in a system area of the SD memory card 101 and a lead-in area of the DVD-RAM 201.

A device key (DevKEY_SD) assigned to the electronic apparatus of this embodiment corresponds to the media key block for an SD memory card. The application program 301 performs authentication of the SD memory card 101 by using this device key (DevKEY_SD). When the SD memory card 101 is found to be valid by this authentication, the application program 301 generates a media-unique key (Kmu_SD1) as an encryption key unique to the SD memory card 101 by using a media key obtained by the authentication result and an media ID (Media ID1) as identification information unique to the SD memory card 101. Encryption and decryption of a content to be recorded on the SD memory card 101 are managed by using the media-unique key (Kmu_SD1). That is, the application program 301 writes the following data on the SD memory card 101.

Kt1[Content]: a content encrypted by a private key called a title key Kt1

Kmu_SD1[Kt1]: a title key encrypted by the media-unique key (Kmu_SD1) of the SD memory card 101

Note that a time variable key using, e.g., random numbers can be used as the title key Kt1.

The DVD-RAM driver 303 provides the application program 301 with a function of handling a DVD-RAM similarly to an SD memory card. All of authentication between the application program 301 and the DVD-RAM 201 and read and write of the DVD-RAM 201 by the application program 301 are performed via the DVD-RAM driver 303.

The DVD-RAM driver 303 has a device key (DevKEY_RAM) corresponding to a media key block (MKB_RAM) for a DVD-RAM, and can perform authentication of the DVD-RAM 201. This DVD-RAM driver 303 further includes the following functions:

a function of acquiring the latest media key block (MKB_SD2) for an SD memory card from a WEB server or from an installation CD of the DVD-RAM driver 303 and writing this media key block in the user data area of the DVD-RAM 201 a function of reading out the latest media key block (MKB_SD2) for an SD memory card, instead of the media key block (MKB_RAM) for a DVD-RAM in response to a request for authentication of the DVD-RAM 201 from the application program 301, and transferring the readout media key block to the application program 301

Details of these functions will be described later with reference to the accompanying drawing from FIG. 4.

(Media Key Block)

The relationship between the media key block and the device key will be described below with reference to FIGS. 2A and 2B.

As described above, the media key block and the device key are defined for each type of recording medium. FIG. 2A shows the relationship between the media key block (MKB_SD1) and the device key (DevKEY_SD) for an SD memory card. The device key (DevKEY_SD) includes 16 columns of indices (INDEX) and 16 columns of corresponding pieces of key information (KEY). The media key block (MKB_SD1) includes encrypted key matrices of about 16 columns×512 rows. The value of the index in each column of the device key (DevKEY_SD) indicates the reference position on the media key block (MKB_SD1); key information in a row position which is in the same column as a certain index and which is indicated by the value of that index is looked up. For example, when the index value in the first column is "1" as shown in FIG. 2A, the position in the first column and the first row on the media key block (MKB_SD1) is looked up. In this position, a media key A[Km] encrypted by the key ("A" in this example) in the first column of the device key (DevKEY_SD) or an error code A[Ec] is stored. This error code means that the corresponding device key is invalid. Authentication is successful if a media key encrypted by the corresponding key information (KEY) is acquired by one of the 16 indices. With this arrangement, a maximum of $512^{16}$ device keys can be nullified.

FIG. 2B shows the relationship between the media key block (MKB_RAM) and the device key (DevKEY_RAM) for a DVD-RAM. The device key (DevKEY_RAM) includes 16 columns of indices (INDEX) and 16 columns of corresponding pieces of key information (KEY). The media key block (MKB_RAM) includes encrypted key matrices of about 16 columns×2,048 rows. Accordingly, this media key block (MKB_RAM) can nullify a maximum of $2,048^{16}$ device keys.

(Encryption/Decryption of Content)

The principle of encryption/decryption of a content performed by using a recording medium will be described below with reference to FIGS. 3A and 3B. The principle will be explained by taking an SD memory card as an example.

<Content Recording>

FIG. 3A shows the flow of processing during content recording. First, authentication using the SD memory card device key (DevKEY_SD) and the media key block (MKB_SD1) recorded on the SD memory card 101 is performed (process #1), and a media key Km is generated.

The media-unique key (Kmu_SD1) is generated by an arithmetic operation (process #2) using the media key Km and the media ID (Media ID1) recorded on the SD memory card 101. Subsequently, a process (process #3) of encrypting a predetermined title key Kt by the media-unique key (Kmu_SD1) is executed to generate Kmu_SD1[Kt]. Also, a process (process #4) of encrypting a content to be recorded by the title key Kt is performed to generate Kt[Content]. Kmu_SD1[Kt] and Kt[Content] are recorded on the SD memory card 101.

<Content Reproduction>

FIG. 3B shows the flow of processing during content reproduction. First, authentication using the SD memory card device key (DevKEY_SD) and the media key block (MKB_SD1) recorded on the SD memory card 101 is performed (process #5), and the media key Km is generated.

The media-unique key (Kmu_SD1) is generated by an arithmetic operation (process #6) using the media key Km and the media ID (Media ID1) recorded on the SD memory card 101. Subsequently, a process (process #7) of decrypting the encrypted title key Kmu_SD1[Kt] by using the media-unique key (Kmu_SD1) is executed, thereby obtaining the title key Kt. Also, a process (process #8) of decrypting the encrypted content Kt[Content] by using the title key Kt is performed, thereby obtaining and reproducing the content.

(Installation of DVD-RAM Driver)

A process of writing the latest media key block MKB_SD2 for an SD memory card into the DVD-RAM 201 will be described below with reference to FIG. 4.

This writing process is performed by the installer of the DVD-RAM driver 303 when this driver 303 is installed. After the installation, the writing process can be executed at any arbitrary timing by activating a setup program included in the DVD-RAM driver 303. Before the writing process is executed a message "add function of handling DVD-RAM similarly to SD memory card?" is of course indicated to a user, and the writing process is executed only when the user accepts the addition.

Note that this installer (or setup program) 401 can also be regarded as a part of the DVD-RAM driver 303. In this sense, the DVD-RAM driver 303 itself writes the media key block MKB_SD2.

(S1) The installer (or setup program) 401 has the DVD-RAM device key (DevKEY_RAM). The installer (or setup program) 401 performs authentication of the DVD-RAM 201 by using the device key (DevKEY_RAM) and the media key block (MKB_RAM) recorded in the lead-in area of the DVD-RAM 201, thereby obtaining the media-unique key (Kmu_RAM) (process #11) More specifically, the media key Km is obtained first by looking up the media key block (MKB_RAM) by using the device key (DevKEY_RAM). The media-unique key (Kmu_RAM) is then generated from this media key Km and the DVD-RAM inherent media ID (Media ID2) recorded in the lead-in area of the DVD-RAM 201.

(S2) The installer (or setup program) 401 acquires the latest media key block (MKB_SD2) for an SD card memory from a WEB server 501 (process #12).

(S3) The installer (or setup program) 401 encrypts the media key block (MKB_SD2) by using the media-unique key (Kmu_RAM) unique to a DVD-RAM, and writes the result (Kmu_RAM[MKB_SD2]) in the user data area of the DVD-RAM 201 (process #13).

(Writing of Content)

Figure 5:
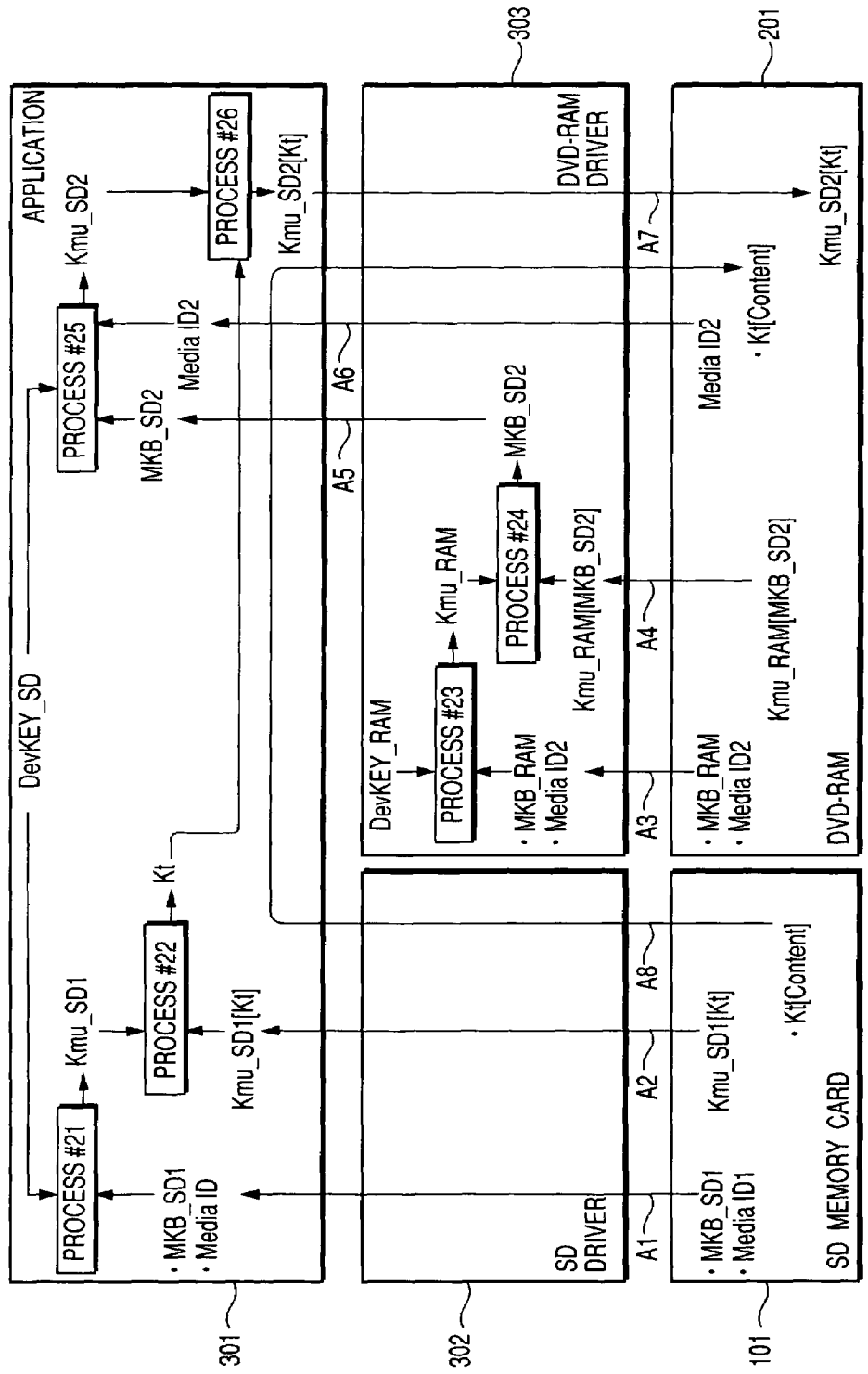
FIG. 5 is a view for explaining the procedure of a content writing process performed by the system of the embodiment.

An operation of writing a content in the DVD-RAM 201 will be described below with reference to FIG. 5. Assume that a content recorded on the SD memory card 101 is to be copied or transferred to the DVD-RAM 201.

(A1) The application program 301 performs authentication of the SD memory card 101 via the SD driver 302 by using the device key (DevKEY_SD) and the media key block (MKB_SD1) recorded on the SD memory card 101, thereby obtaining the media-unique key (Kmu_SD1) (process #21). More specifically, the media key Km is obtained first by looking up the media key block (MKB_SD1) by using the device key (DevKEY_SD). The media-unique key (Kmu_SD1) is then generated from this media key Km and the SD memory card inherent media ID (Media ID1) recorded on the SD memory card 101.

(A2) The application program 301 reads out the encrypted title key (Kmu_SD1[Kt]) from the SD memory card 101 via the SD driver 302, and decrypts the readout title key by using the media-unique key (Kmu_SD1) to obtain Kt (process #22).

(A3) The application program 301 issues a request for authentication of the DVD-RAM 201 to the DVD-RAM driver 303. In response to this request, the DVD-RAM driver 303 performs authentication of the DVD-RAM 201 by using the device key (DevKEY_RAM) and the media key block (MKB_RAM) recorded in the lead-in area of the DVD-RAM 201, thereby obtaining the media-unique key (Kmu_RAM) (process #23). More specifically, the media key Km is obtained first by looking up the media key block (MKB_RAM) by using the device key (DevKEY_RAM). The media-unique key (Kmu_RAM) is then generated from this media key Km and the media ID (Media ID2) of the DVD-RAM 201.

(A4) The DVD-RAM driver 303 reads out the encrypted media key block (Kmu_RAM[MKB_SD2]) recorded on the DVD-RAM 201, and decrypts the readout media key block by using the media-unique key (Kmu_RAM) to obtain MKB_SD2 (process #24). The DVD-RAM driver 303 transfers this MKB_SD2 to the application program 301.

(A5 & A6) When acquiring MKB_SD2 from the DVD-RAM 303, the application program 301 performs authentication of the DVD-RAM 201 by using this MKB_SD2 and the device key (DevKEY_SD), thereby obtaining the media-unique key (Kmu_SD2) (process #25). More specifically, the media key Km is obtain ed first by looking up the media key block (MKB_SD2) by using the device key (DevKEY_SD). The media-unique key (Kmu_SD2) is then generated from this media key Km and the media ID (Media ID2) of the DVD-RAM 201.

(A7) The application program 301 encrypts the title key Kt obtained in process #22 by using the media-unique key (Kmu_SD2), thereby obtaining Kmu_SD2[Kt]. The application program 301 writes this Kmu_SD2[Kt] into the DVD-RAM 201 via the DVD-RAM driver 303 (process #26).

(A8) The application program 301 loads the encrypted content (Kt[Content]) from the SD memory card 101, and writes the content into the DVD-RAM 201 via the DVD-RAM driver 303.

(Reproduction of Content)

Figure 6:
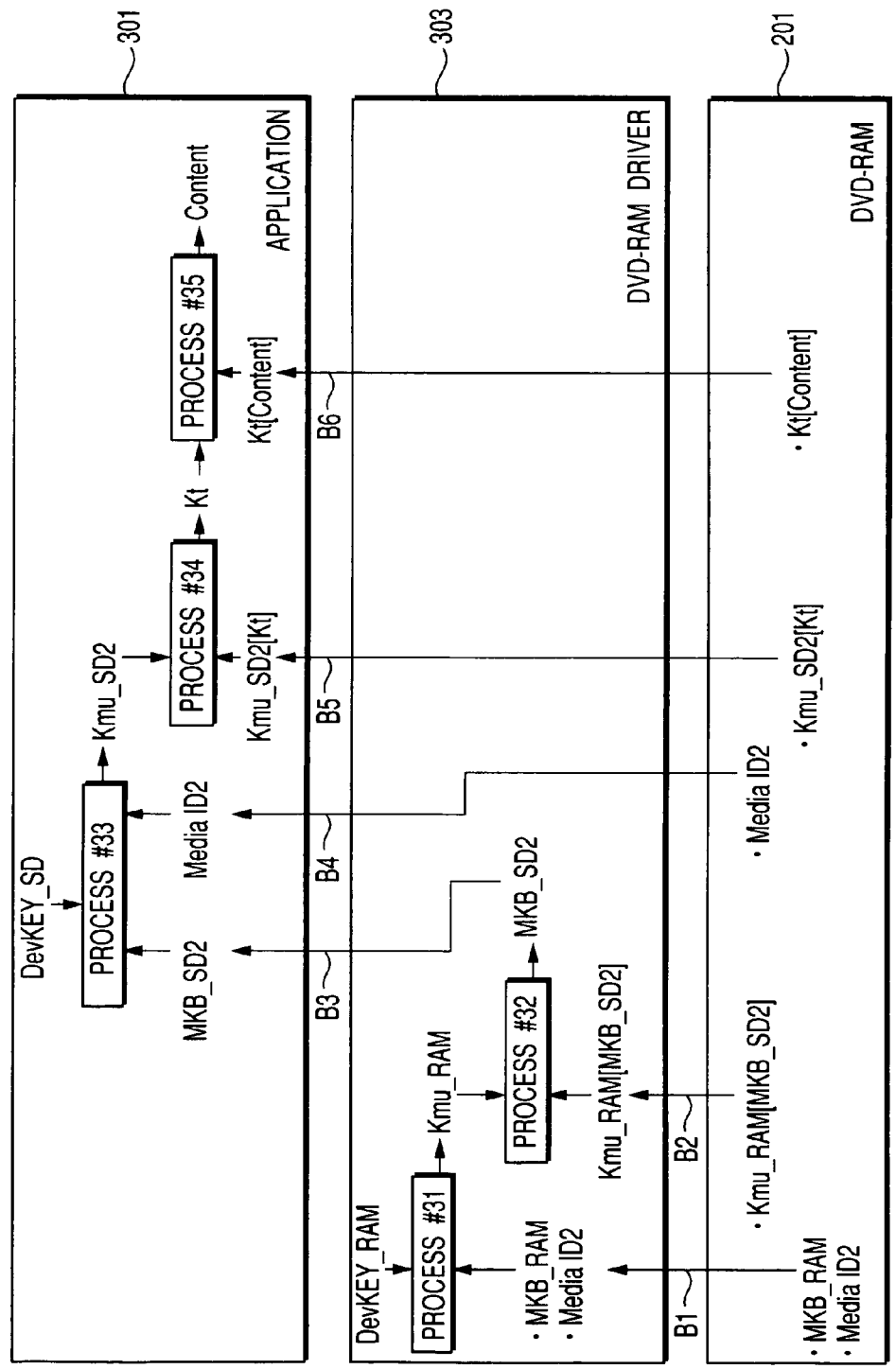
FIG. 6 is a view for explaining the procedure of a content reproducing process performed by the system of the embodiment.

An operation by which the application program 301 reproduces a content recorded on the DVD-RAM 201 will be described below with respect to FIG. 6.

(B1) The application program 301 issues a request for authentication of the DVD-RAM 201 to the DVD-RAM driver 303. In response to this request, the DVD-RAM driver 303 performs authentication of the DVD-RAM 201 by using the device key (DevKEY_RAM) and the media key block (MKB_RAM) recorded in the lead-in area of the DVD-RAM 201, thereby obtaining the media-unique key (Kmu_RAM) (process #31). More specifically, the media key Km is obtained first by looking up the media key block (MKB_RAM) by using the device key (DevKEY_RAM). The media-unique key (Kmu_RAM) is then generated from this media key Km and the media ID (Media ID2) of the DVD-RAM 201.

(B2) The DVD-RAM driver 303 reads out the encrypted media key block (Kmu_RAM[MKB_SD2]) recorded on the DVD-RAM201, and decrypts the read out media key block by using the media-unique key (Kmu_RAM) to obtain MKB_SD2 (process #32). The DVD-RAM driver 303 transfers this MKB_SD2 to the application program 301.

(B3 & B4) When acquiring MKB_SD2 from the DVD-RAM 303, the application program 301 performs authentication of the DVD-RAM 201 by using this MKB_SD2 and the device key (DevKEY_SD), thereby obtaining the media-unique key (Kmu_SD2) (process #33). More specifically, the media key Km is obtained first by looking up the media key block (MKB_SD2) by using the device key (DevKEY_SD). The media-unique key (Kmu_SD2) is then generated from this media key Km and the media ID (Media ID2) of the DVD-RAM 201.

(B5) The application program 301 reads out the encrypted title key (Kmu_SD2[Kt]) from the DVD-RAM 201 via the DVD-RAM driver 303, and decrypts the readout title key by using the media-unique key (Kmu_SD2) to obtain Kt (process #34).

(B6) The application program 301 reads out the encrypted content (Kt[Content]) from the DVD-RAM 201 via the DVD-RAM driver 303, and reproduces the content by decrypting it by using Kt (process #35).

In this embodiment as described above, the DVD-RAM driver 303 as a control program for a DVD-RAM drive records the media key block MKB_SD for an SD memory card on the DVD-RAM 201. By using this recorded media key block MKB_SD, the application program 301 executes authentication of the DVD-RAM 201. This allows a DVD-RAM to be handled by the device key DevKEY_SD for an SD memory card. Accordingly, valid recording media corresponding to a copyright protecting function can be equally handled regardless of the types of these media.

In particular, the media key block MKB_SD for an SD memory card is written in the DVD-RAM 201 after being encrypted by Kmu_RAM obtained by authentication using MKB_RAM. This consequently relates the media key block MKB_SD to MKB_RAM, making it possible to keep MKB_SD secret.

In this embodiment, the latest media key block MKB_SD2 is acquired and recorded on a DVD-RAM to meet an increase in the number of device keys to be eliminated. Therefore, if MKB_SD recorded on an SD memory card is the latest or a relatively new one, this MKB SD can be recorded on a DVD-RAM.

Also, a title key as a content encryption key is encrypted by using a media-unique key. However, it is also possible to use a media-unique key as a title key and encrypt a content by using this media-unique key.

A similar method can be applied not only to a DVD-RAM and SD memory card but also to various other recording media.

Furthermore, this embodiment is applicable not only to PCs but also to all data processing apparatuses (computer-applied apparatuses) using microprocessors, such as set-top boxes, game machines, and audio/video players.

Effects analogous to those of this embodiment are readily obtainable by introducing a computer program describing the procedures of the content management method explained in the embodiment to a computer or to a computer-applied apparatus via a recording medium.

In the present invention as has been described above, it is possible to handle a recording medium of a certain media type by using device identification information corresponding to another specific media type, and to equally handle valid recording media corresponding to a copyright protecting function regardless of the types of these media. Accordingly, content management having high extensibility and high compatibility is implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A content processing system in an electronic apparatus, comprising:
    a data processing unit capable of reading/writing data from/to a recording medium of a first media type detachably connected to the electronic apparatus and a recording medium of a second media type;
        a first interface configured to interface the data processing unit with said recording medium of the first media type; and
        a second interface configured to interface the data processing unit with said recording medium of the second media type,
    the data processing unit including:
        a first device driver configured to control said recording medium of the first media type via the first interface;
        a second device driver configured to control said recording medium of the second media type via the second interface;
        a revocation list acquiring unit configured to acquire, via the first interface, first revocation list information recorded on said recording medium of the first media type by using the first device driver; and
        a revocation list recording unit configured to record, via the second interface, the first revocation list information on said recording medium of the second media type by using the second device driver, the recorded first revocation list information being used in authentication between said electronic apparatus and said recording medium of the second media type.

2. The system according to claim 1, wherein the revocation list recording unit records the first revocation list information by encrypting the first revocation list information by using a media-unique key unique to said recording medium of the second media type.

3. The system according to claim 2, wherein the media-unique key is generated on the basis of second revocation list information recorded on said recording medium of the second media type.

4. The system according to claim 1, further comprising:
    a first authentication unit configured to perform authentication between said electronic apparatus and said recording medium of the second media type by using a device key of said electronic apparatus and second revocation list information recorded on said recording medium of the second media type;
    a media-unigue key generating unit configured to generate a media-unique key unique to said recording medium of the second media type on the basis of the result of the authentication; and
    a revocation list encrypting unit configured to encrypt the acquired first revocation list information by using the generated media-unique key,
    wherein the revocation list recording unit records the encrypted first revocation list information on said recording medium of the second media type.

5. The system according to claim 4, further comprising:
    a second authentication unit configured to perform authentication between said electronic apparatus and said recording medium of the second media type by using the device key and the recorded first revocation list information, when a content is to be written on said recording medium of the second media type.

6. The system according to claim 4, further comprising:
    a second authentication unit configured to perform authentication between said electronic apparatus and said recording medium of the second media type by using the device key and the recorded first revocation list information, when a content is to be reproduced from said recording medium of the second media type.

7. A content protecting method applied to an electronic apparatus having a data processing unit capable of reading/writing data from/to a recording medium of a first media type detachably connected to the electronic apparatus and a recording medium of a second media type, the method comprising:
    loading, via a first interface, first revocation list information recorded on said recording medium of the first media type by using a first device driver which controls said recording medium of the first media type;
    recording, via a second interface, the loaded first revocation list information on said recording medium of the second media type by using a second device driver which controls said recording medium of the second media type; and
    using the recorded first revocation list information in authentication between said electronic apparatus and said recording medium of the second media type.

8. The method according to claim 7, wherein the recording comprises recording the first revocation list information by encrypting the first revocation list information by using a media-unique key unique to said recording medium of the second media type.

9. The method according to claim 8, wherein the media-unique key is generated on the basis of second revocation list information recorded on said recording medium of the second media type.

10. The method according to claim 7, further comprising:
    performing authentication between said electronic apparatus and said recording medium of the second media type by using a device key of said electronic apparatus and second revocation list information recorded on said recording medium of the second media type;
    generating a media-unique key unique to said recording medium of the second media type on the basis of the result of the authentication; and encrypting the acquired first revocation list information by using the generated media-unique key, wherein recording the loaded first revocation list comprises recording the encrypted first revocation list information on said recording medium of the second media type.

11. The method according to claim 10, further comprising:

performing authentication between said electronic apparatus and said recording medium of the second media type by using the device key and the recorded first revocation list information, when a content is to be written on said recording medium of the second media type.

12. The method according to claim 10, further comprising:

performing authentication between said electronic apparatus and said recording medium of the second media type by using the device key and the recorded first revocation list information, when a content is to be reproduced from said recording medium of the second media type.

* * * * *